(12) United States Patent
Movlazada

(10) Patent No.: US 8,689,956 B2
(45) Date of Patent: Apr. 8, 2014

(54) TORSIONAL VIBRATION DAMPER

(75) Inventor: Parviz Movlazada, Rastatt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 414 days.

(21) Appl. No.: 13/029,708

(22) Filed: Feb. 17, 2011

(65) Prior Publication Data

US 2011/0139559 A1     Jun. 16, 2011

Related U.S. Application Data

(63) Continuation of application No. PCT/DE2009/001088, filed on Aug. 3, 2009.

(30) Foreign Application Priority Data

Aug. 21, 2008     (DE) .......................... 10 2008 038 605

(51) Int. Cl.
    *F16F 7/10*            (2006.01)

(52) U.S. Cl.
    USPC .......................... 188/378; 192/30 V; 74/574.2

(58) Field of Classification Search
    USPC ......... 188/378; 192/30 V; 74/574.2; 464/180; 416/144, 145
    See application file for complete search history.

(56) References Cited

U.S. PATENT DOCUMENTS

| | | | |
|---|---|---|---|
| 5,884,735 A * | 3/1999 | Eckel et al. ................... | 188/378 |
| 6,280,330 B1 * | 8/2001 | Eckel et al. ....................... | 464/3 |
| 6,345,552 B1 * | 2/2002 | Rohrig et al. ................ | 74/574.4 |
| 6,450,065 B1 * | 9/2002 | Eckel et al. ................... | 74/574.4 |
| 6,742,412 B2 * | 6/2004 | Feldhaus et al. ............. | 74/574.2 |
| 8,161,740 B2 * | 4/2012 | Krause et al. ................... | 60/338 |

FOREIGN PATENT DOCUMENTS

DE            19631989        9/1997
EP              803659 A1 * 10/1997

\* cited by examiner

*Primary Examiner* — Thomas J Williams
(74) *Attorney, Agent, or Firm* — Simpson & Simpson, PLLC

(57) ABSTRACT

A torsional vibration damper with a receptacle for several absorber masses pivotally held relative to the receptacle disposed around an axis of rotation in radial and circumferential direction. To be able to increase the mass of the absorber masses, the absorber masses have outside contours formed by several outside contour radii that remain within the receptacle over their entire swivel angle, and swivel over the entire swivel range near the outer circumference of the receptacle.

11 Claims, 3 Drawing Sheets

TORSIONAL VIBRATION DAMPER

CROSS-REFERENCE TO RELATED APPLICATIONS

This application is filed under 35 U.S.C. §120 and §365(c) as a continuation of International Patent Application PCT/DE2009/001088, filed Aug. 3, 2009, which application claims priority from German Patent Application No. 10 2008 038 605.7, filed Aug. 21, 2008, which applications are incorporated herein by reference in their entireties.

FIELD OF THE INVENTION

The invention relates to a torsional vibration damper with a receptacle rotating around an axis of rotation and several, pivoted absorber masses disposed over the circumference.

BACKGROUND OF THE INVENTION

Generic torsional vibration dampers are well known for example as centrifugal force pendulums and are partially contained in radially congested spaces. DE 196 31 989 C1 discloses a torsional vibration damper by which absorber masses are provided with outside contours formed by a single radius. Through appropriate design of raceways for holding the absorber masses for a default radius, the absorber masses remain radially within the hub part so that the hub part can be disposed near a radially surrounding space.

For effectiveness of vibration absorption by a torsional vibration damper, the attainable absorber masses in a given space are of decisive importance. Object of the invention is therefore to develop a torsional vibration damper with an increased total mass of several absorber masses disposed over the circumference of the receptacle of a specified space.

BRIEF SUMMARY OF THE INVENTION

The object of the invention is met by a torsional vibration damper with a receptacle disposed around an axis of rotation having an outer circumference and several absorber masses guided radially on raceways in the receptacle and limitedly pivotally held in circumferential direction with a radial outside contour and a radial inside contour that extends over a circumferential segment of the receptacle, whereby the outside contour is restricted to the outer circumference of the receptacle during displacement of the absorber mass along the raceways and the outside contour and/or inside contour, based on a rotation angle around the axis of rotation, comprise/s different radii. Such an embodiment of outside contours of absorber masses can be spherical according to the number of different outside contour radii used over the stretch of the outside contour in circumferential direction and can form an individual curve not describing any outside contour radius. Thereby, this curve is adapted over the swivel angle of the absorber mass to the outer circumference of the receptacle such that the absorber mass is not exceeded radially, however, the radially extreme area of the absorber mass is approached maximally on the outer circumference of the receptacle during swiveling, so that, over the entire circumference of the absorber mass, the outside contour preferably has the same minimized distance of the radial extreme area towards the outer circumference, without protruding over the outer circumference at a working point during swiveling. Through this maximum approach, at all working points of absorber masses to the outer circumference of the receptacle, carrier masses can contain more mass than when using an individual outside contour radius.

The outside contour is dependent on embodiment of raceways introduced in the receptacle, in which absorber masses are received in a pivoted manner, in that they are displaced in a known manner dependent on the vibration conditions prevailing in radial and circumferential direction. The raceways are thereby adapted to the vibration problems to be solved. A first advantageous approach can provide a middle segment of the outside contour with a larger outside contour radius with respect to the outside contour radii of end segments. In this manner, a flatter shape of the outside contour is obtained relative to a single outside contour radius, so that in the end segments additional masses can be planned, since it is proven that in a multitude of applications the outside contours with a single outside contour radius for large swivel angles have an enlargement of the distance of the radial external area relative to the outer circumference of the receptacle. Thereby, for symmetry reasons, the outside contour radii of the end segments are advantageously the same. Absorber masses with an asymmetrical arrangement of the outside contour radii can be provided also on torsional vibration dampers adapted to special vibration problems.

The design of the outside contour is advantageously from the rotation angle around the axis of rotation, whereby the outside contour radii are defined extending over the outside contour based on the axis of rotation as midpoint, so that the shape of the outside contour can be described over the circumference in a polar coordinate system by specifying the outside contour radius dependent on the rotation angle around the axis of rotation. It has further proved advantageous if outside contour radius and rotation angle are specified dependent on the swivel angle of absorber masses with respect to the receptacle around a swivel midpoint. Further, it can be advantageous, if the outside contour is provided dependent on a swivel radius of the absorber masses swiveling around their midpoint. Further, the outside radius of the outside contour dependent on the rotation angle can be provided depending on the number of absorber masses distributed over the circumference. Thus, the division angle can be given as an input quantity, for example, when using four absorber masses at 90° or for a maximum swivel angle of the absorber masses plus a distance between both absorber masses.

In a symmetrical arrangement of the outside contour, based on a center line of an absorber mass, the outside contour, starting from a neutral position of the rotation angle 0° and a swivel angle 0°, outside contour in both directions of the rotation angle, and swivel angle can be described as a symmetrical arrangement. An advantageous torsional vibration damper is thereby equipped with an outside contour in which the outside contour radius, starting from the axis of rotation of the outside contour of a given number of absorber masses distributed capably of swiveling over the circumference of the receptacle and dependently on rotation angle, is formed around a neutral position with respect to the receptacle within a maximum swivel angle with a swivel angle and a swivel radius with respect to the receptacle.

A particularly advantageous exemplary embodiment associates the above-specified input quantities in the following mathematical context, whereby the outside contours are represented in a polar coordinate system dependent on the outside contour radius $R_i$ and the rotation angle $\alpha_i$:

$$R_i = \sqrt{R_{max}^2 + k^2 + 2kR_{max}\sin\left(\arcsin\left(\frac{h\sin\beta_i}{s}\right) - \frac{\beta_i}{2}\right)} \quad (1)$$

$$\alpha_i = \arccos\left[\frac{(h+l)^2 + R_i^2 - (R_{max} - s)^2}{2R_i(h+l)}\right] \quad (2)$$

with $$s = \sqrt{h^2 + l^2 + 2hl\cos\beta_i} \quad (3)$$

$$k = 2l\sin\frac{\beta_i}{2} \quad (4)$$

$$h = l\sin(\beta_{max} - \gamma)/\sin\gamma \quad (5)$$

$$\gamma = \frac{360°}{2n} \quad (6)$$

$R_{max}$ radius of the receptacle
$\beta_{max}$ maximum swivel angle of the absorber mass
$\beta_i$ swivel angle of the absorber mass
n number of absorber masses distributed over the circumference
l swivel radius of absorber masses Equations (1) and (2) are supplemented by the variables of equations (3) to (5), equation (5) is supplemented by equation (6). Dependent on the characteristics of the raceways, characterized by variables of the swivel angle $\beta_i$, of the maximum swivel angle $\beta_{max}$ and the swivel radius l, in dependence on the rotation angle $\alpha_i$ the outside contour radii $R_i$ are assigned to the outside contour. Furthermore, they depend on the division of absorber masses, thus depend on the number of absorber masses uniformly distributed over the circumference.

In accordance with the inventive idea, also the inside contour of absorber masses is adapted so that the effective mass of the absorber mass can be increased, in that the conditions given by the space are exploited advantageously. Hereby it is assumed that the receptacle is a function carrier for further functions. For example, the receptacle can be contained as a component of the torsional vibration damper in a more complex vibration-damper device, for example in a dual mass flywheel, in housing of a torque converter or in other arrangements. In that way, the space available for containing carrier masses on the receptacle is generally limited to an annular space, with an outer circumference and an inside circumference. For the advantageously improved utilization of the space, an inside contour limiting the absorber mass radially inside can be formed in this case out of a circular segment extending from a neutral position of the absorber mass in both circumferential directions. Thereby the circular segments can be separated from one another by a line section extending straight over a given length.

The inside contour radius of each circular segment thereby has a respective midpoint that is formed by an intersection of a swivel radius of the absorber mass, drawn around the axis of rotation, and the maximum swivel angle around the axis of rotation. The inside contour radius of both circular segments is larger than the inside circumference of the available space and therefore larger than space limit of the receptacle.

Furthermore, the absorber mass is advantageously limited in circumferential direction by side contours connecting the outside and inside contours on both sides of the absorber mass, whereby the side contours are spaced from one another around a division angle minus a safety distance. The division angle is defined preferably by the number of absorber masses disposed over the circumference of the receptacle. At least a side contour is disposed in parallel to a line disposed around a midpoint whereby the midpoint is formed by an intersection of a swivel radius of the absorber mass drawn around the axis of rotation and the maximum swivel angle plotted around the axis of rotation. In a further embodiment, at least a side contour is circular section for section.

BRIEF DESCRIPTION OF THE SEVERAL VIEWS OF THE DRAWING

Various embodiments are disclosed, by way of example only, with reference to the accompanying schematic drawings in which corresponding reference symbols indicate corresponding parts, in which.

DETAILED DESCRIPTION OF THE INVENTION

Figure 1:
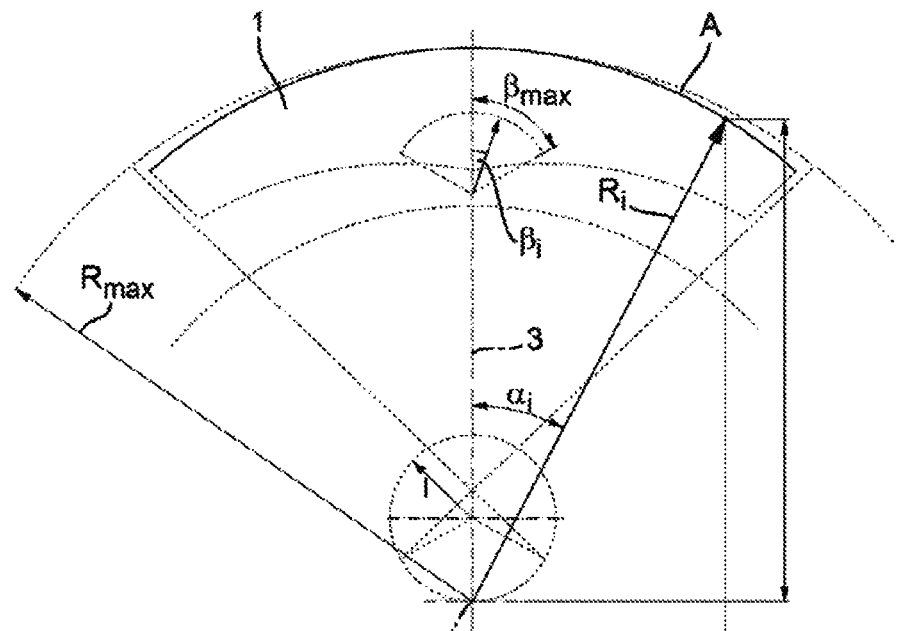
FIG. 1 is a systematic sketch of an outside contour of an absorber mass of a torsional vibration damper.

FIG. 1 shows the outside contour A of an absorber mass 1 in continuous line. The remaining lines are purely of geometric nature and because they do not have to correspond to the construction lines of the torsional vibration damper, they are depicted in dashes. The absorber mass 1 is disposed within a division of the drive part in circumferential direction, which corresponds to an angle of 90° in the shown exemplary embodiment, so that four absorber masses 1 are disposed on the receptacle over the circumference of the torsional vibration damper. The radius $R_{max}$ indicates the outer circumference of the receptacle around the axis of rotation 2. The outside contour radius $R_i$ indicates the distance of the outside contour A from the axis of rotation 2 dependent on the rotation angle $\alpha_i$, whereby the outside contour radius $R_i$ as a result of which the zero line in $\alpha_i$=0 takes the same values symmetrically on two-sides of the zero line 3 for negative and positive rotation angles $\alpha_i$.

The absorber mass 1 is pivotally held around the zero line 3 with respect to the receptacle respectively two-sided about the swivel angle $\beta_i$ between the values 0° and $\beta_{max}$ with a swivel radius l.

Corresponding to equations (1) to (6) described above, the advantageous outside contour A as self-adjusting outside contour radii $R_i$ dependent on the rotation angle $\alpha_i$ results from the dependencies of radius $R_{max}$, the maximum swivel angle $\beta_{max}$, the swivel angle $\beta_i$ and the swivel radius l. The outside contour A is characterized by an advantageous shape in that over the entire swivel range of the absorber mass 1 with respect to the receptacle, the distance of the outside contour A from the radius $R_{max}$ 3 is minimum at the zero-line height. Such an outside contour can be produced easily with numerically controlled machine tools. For example, a so-called CNC milling machine can be programmed on such an outside contour and produce the absorber masses directly or produce a tool for punching the respective masses.

Figure 2:
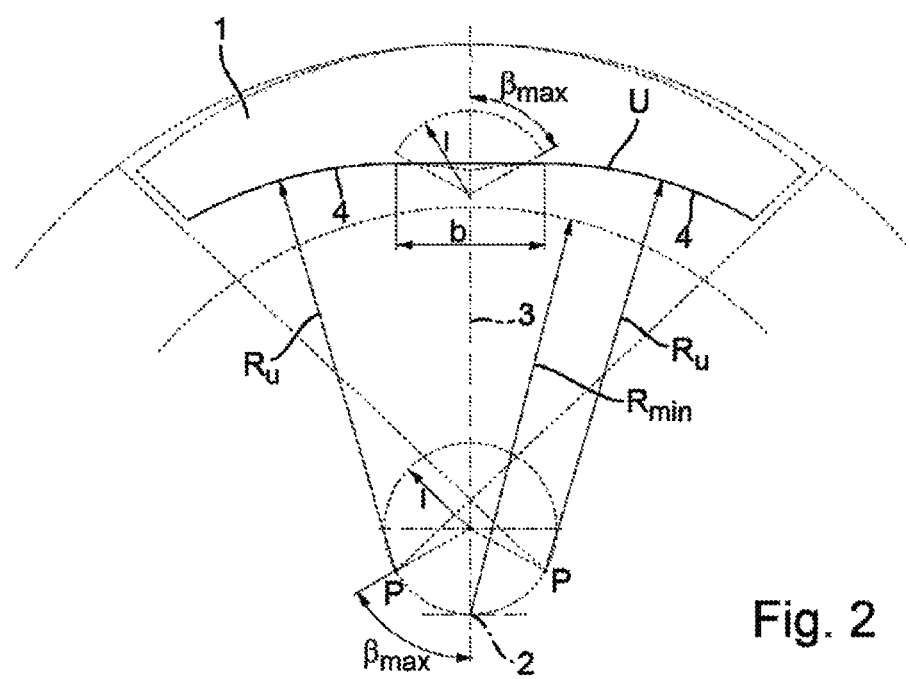
FIG. 2 is a systematic sketch of an inside contour of an absorber mass of a torsional vibration damper

FIG. 2 shows the formation of the inside contour U of the absorber mass 1 in a manner corresponding to FIG. 1. The inside contour U is formed by two circular segments 4 with an inside contour radius $R_u$. The circular segments 4 are separated around the zero line 3 by a linear section, which preferably fulfills the condition $0 \leq b \leq 2/\sin \beta_{max}$. The midpoints P of the inside contour radii $R_u$ are defined through the maximum swivel angles $\beta_{max}$ on a circle shifted radially within the swivel radius l from the axis of rotation 2 of the receptacle. Thereby, the inside contour radii $R_u$ correspond to $R_{min}$ of the inside circumference of the receptacle, and/or the space at disposal for the respective radius.

Figure 3:
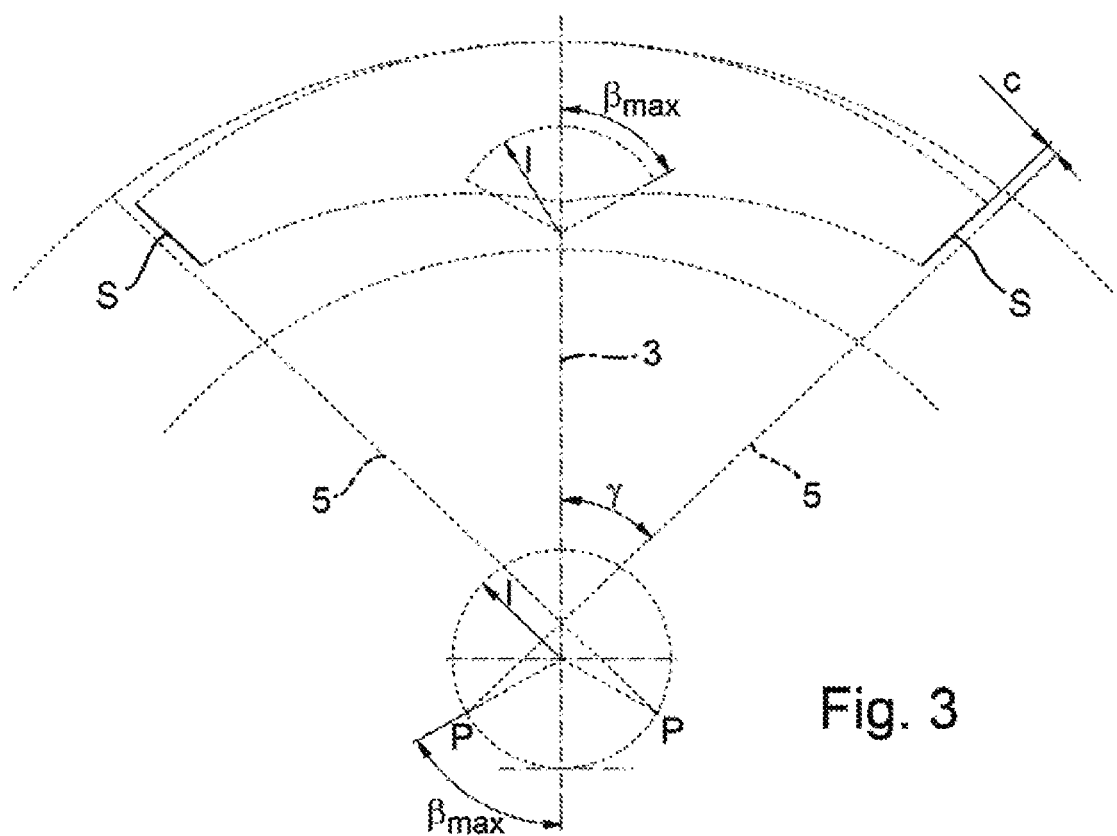
FIG. 3 is a systematic sketch of the side contours of an absorber mass of a torsional vibration damper.

FIG. 3 show a representation of the side contours S similar to FIGS. 1 and 2. The shape of side contours is formed by the division lines 5, resulting from the division of the receptacle, which are drawn up to the zero line 3 starting from the midpoints P at the division angle γ defined in FIG. 2. The side contours S are oriented at a distance c, dimensioned accordingly for safe spacing of adjacent absorber masses, within permissible component tolerances, and avoiding collision at the division line 5.

Figure 4:
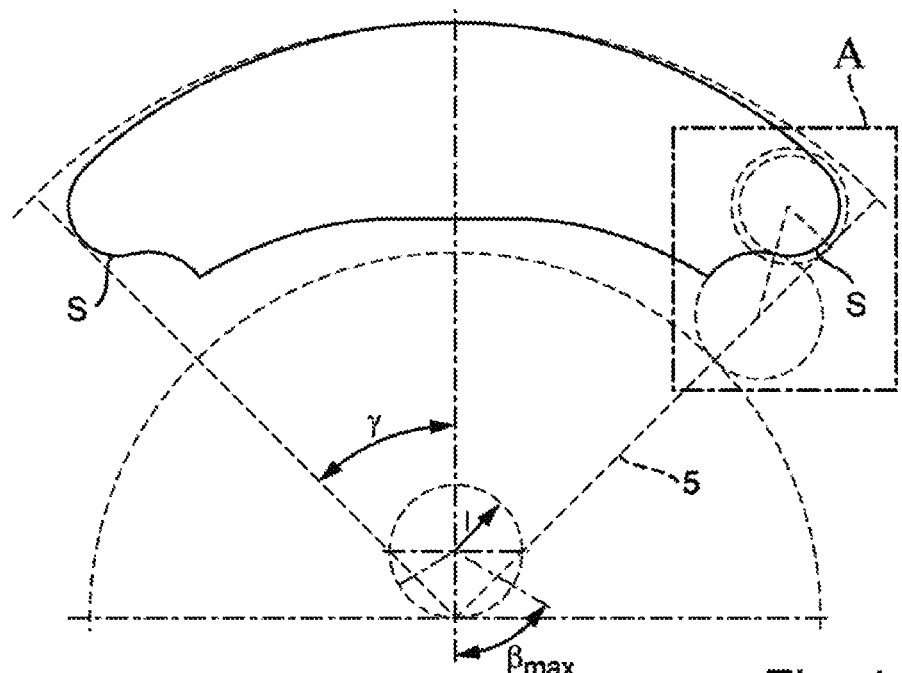
FIG. 4 is a systematic sketch of an absorber mass of a torsional vibration damper in a further embodiment.
Figure 5:
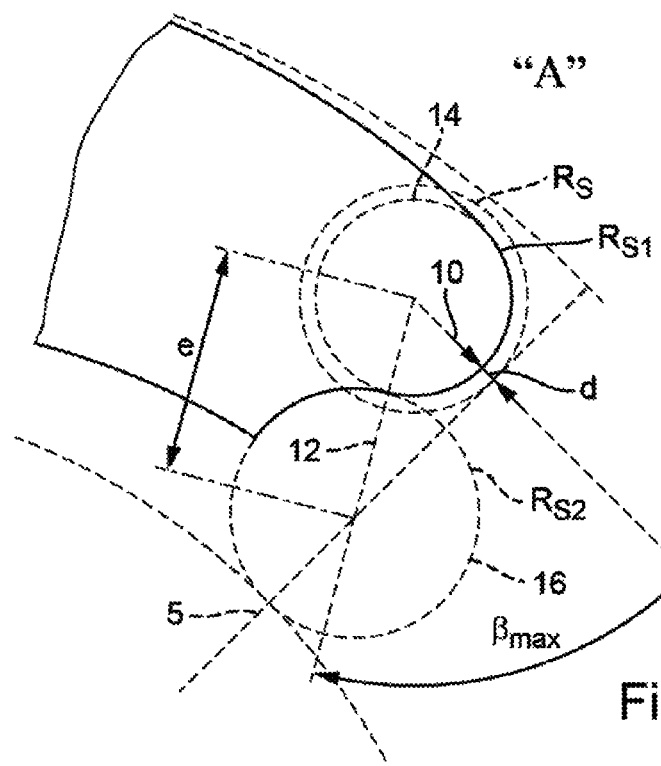
FIG. 5 is a section A of FIG. 4 in an enlarged representation.

In FIG. 4 and FIG. 5, a systematic sketch of an absorber mass of a torsional vibration damper is shown in a further embodiment. The side contour S of the absorber mass comprises a circular segment-like form, formed by two adjacent circles 14, 16 at a distance e, whereby a first circle 14 adjacent to the outside contour is designated by the radius $R_{s1}$ and a second circle 16 overlapping the inside contour is designated by the radius $R_{s2}$. Both circles 14, 16 lie tangentially adjacently to each other and the midpoint of the second circle 16 can lie on the division line 5 that lies tangentially to a construction circle with the defined radius $R_s$ formed under incorporation of the swivel radius l and the division angle γ particularly through the relationship $R_s = 1 \sin \gamma$, whereby the construction circle with the first circles 14 have a common midpoint and a radius $R_s$ that is larger in magnitude by the distance d. The centerline defined through the midpoints of the first and second circle 12 can be inclined, with respect to the normal 10, to the division line 5 at angle $\beta_{max}$.

| List of reference symbols | |
| --- | --- |
| 1 | absorber mass |
| 2 | axis of rotation |
| 3 | zero line |
| 4 | circular segment |
| 5 | division line |
| 10 | normal |
| 12 | center line |
| 14 | first circle |
| 16 | second circle |
| A | outside contour |
| b | line section |
| c | distance |
| d | distance |
| e | distance |
| l | swivel radius |
| P | midpoint |
| $R_i$ | outside contour radius |
| $R_{max}$ | outer circumference radius |
| $R_{s1}$ | side contour radius |
| $R_{s2}$ | side contour radius |
| $R_s$ | construction radius |
| $R_u$ | inside contour radius |
| $R_{min}$ | inside circumference radius |
| S | side contour |
| U | inside contour |
| $\alpha_i$ | rotation angle |
| $\beta_i$ | swivel angle |
| $\beta_{max}$ | maximum swivel angle |
| γ | division angle |

I claim:

1. A torsional vibration damper, comprising:
a receptacle disposed around an axis of rotation, having an outer circumference; and,
several absorber masses guided radially on raceways in the receptacle and limitedly pivotally held in circumferential direction with a radially outside contour and a radially inside contour, which extends over a circumferential segment of the receptacle, wherein:
the outside contour is restricted to the outer circumference of the receptacle during displacement of the absorber mass along the raceways;
the outside contour or inside contour comprise different radii based on a rotation angle around the axis of rotation;
the inside contour of the absorber masses is formed respectively by a circular segment extending in both circumferential directions from a zero line of the absorber mass; and,
an inside contour between the circular segments is formed straight over a given length in the form of a line section.

2. The torsional vibration damper according to claim 1, wherein a middle segment of the outside contour has a larger outside contour radius with respect to respective outside contour radii of end segments.

3. The torsional vibration damper according to claim 2, wherein the outside contour radii of the end segments are equal.

4. The torsional vibration damper according to claim 1, wherein an outside contour radius of the outside contour depending on the rotation angle is dependent on a swivel angle of the absorber mass with respect to the receptacle.

5. The torsional vibration damper according to claim 1, wherein an outside contour radius of the outside contour depending on the rotation angle over the outside contour is dependent on a swivel radius of the absorber mass with respect to the receptacle.

6. The torsional vibration damper according to claim 1, wherein, an outside contour radius of the outside contour depending on the rotation angle is dependent on a number of absorber masses distributed over the circumference.

7. The torsional vibration damper according to claim 1, wherein, respective inside contour radii of circular segments have a midpoint that is defined by a circle shifted radially inwards by a swivel radius with respect to the axis of rotation, with a maximum swivel angle disposed with the swivel radius.

8. The torsional vibration damper according to claim 1, wherein, the absorber mass in circumferential direction is limited by the outside and inside contours on both sides of side contours connecting the absorber mass, whereby said side contours are spaced apart by a division angle minus a distance.

9. The torsional vibration damper according to claim 8, wherein, at least one side contour is disposed parallel to a line around a midpoint, whereby the midpoint is defined by a circle shifted radially inwards through a distance equal to a swivel radius with respect to the axis of rotation with a maximum swivel angle disposed with the swivel radius.

10. The torsional vibration damper according to claim 8, wherein, at least one side contour is segmentally circular.

11. A torsional vibration damper, comprising:
a receptacle disposed around an axis of rotation, having an outer circumference; and,
several absorber masses guided radially on raceways in the receptacle and limitedly pivotally held in circumferential direction with a radial outside contour and a radial inside contour, which extends over a circumferential segment of the receptacle, wherein:

the outside contour is restricted to the outer circumference of the receptacle during displacement of the absorber mass along the raceways;
the inside contour comprises different radii based on a rotation angle around the axis of rotation;
an outside contour radius of the outside contour originating from the axis of rotation of the outside contour is dependent on the rotation angle and how many absorber masses are included in the several absorber masses, the absorber masses distributed over the circumference of the receptacle, pivotally held about a zero line with respect to the receptacle, within a maximum swivel angle, with a swivel angle and a swivel radius with respect to the receptacle; and,
the outside contour in a polar coordinate system is deposited dependent on the outside contour radius and on the rotation angle in the following context:

$$R_i = \sqrt{R_{max}^2 + k^2 + 2kR_{max}\sin\left(\arcsin\left(\frac{h\sin\beta_i}{s}\right) - \frac{\beta_i}{2}\right)}$$

and $$\alpha_i = \arccos\left[\frac{(h+l)^2 + R_i^2 - (R_{max} - s)^2}{2R_i(h+l)}\right]$$

with $$s = \sqrt{h^2 + l^2 + 2hl\cos\beta_i};$$

$$k = 2l\sin\frac{\beta_i}{2};$$

$$h = l\sin(\beta_{max} - \gamma)/\sin\gamma;$$

$$\gamma = \frac{360°}{2n};$$

$R_{max}$ radius of the receptacle
$\beta_{max}$ maximum swivel angle of the absorber mass
$\beta_i$ swivel angle of the absorber mass
n number of absorber masses distributed over the circumference.

* * * * *